US012165539B2

(12) United States Patent
Nisar et al.

(10) Patent No.: US 12,165,539 B2
(45) Date of Patent: Dec. 10, 2024

(54) METHOD AND SYSTEM FOR INTELLIGENT INTERPRETATION OF INFORMATION TO AUTONOMOUSLY DESIGN IN-CLASS/HYBRID/REMOTE ASSESSMENT

(71) Applicant: SUFIAN MUNIR INC., San Diego, CA (US)

(72) Inventors: Zahid Nisar, Rawalpindi (PK); Farhan Hassan, San Diego, CA (US); Sufian Munir, San Diego, CA (US)

(73) Assignee: SUFIAN MUNIR INC.

( * ) Notice: Subject to any disclaimer, the term of this patent is extended or adjusted under 35 U.S.C. 154(b) by 0 days.

(21) Appl. No.: 18/091,334

(22) Filed: Dec. 29, 2022

(65) Prior Publication Data

US 2024/0221524 A1 Jul. 4, 2024

(51) Int. Cl.
*G09B 7/00* (2006.01)
*G09B 7/02* (2006.01)
*G09B 7/06* (2006.01)
*G10L 15/08* (2006.01)

(52) U.S. Cl.
CPC ............... *G09B 7/00* (2013.01); *G09B 7/02* (2013.01); *G09B 7/06* (2013.01); *G10L 2015/088* (2013.01)

(58) Field of Classification Search
CPC ............... G09B 7/00; G09B 7/02; G09B 7/06
See application file for complete search history.

(56) References Cited

U.S. PATENT DOCUMENTS

| | | | |
|---|---|---|---|
| 2007/0072164 A1* | 3/2007 | Katsuyama | G09B 5/067 434/353 |
| 2016/0133148 A1* | 5/2016 | Hanks | G09B 7/06 434/362 |
| 2022/0222434 A1* | 7/2022 | Milani De Oliveira | G09B 7/00 |
| 2022/0309949 A1* | 9/2022 | Dasgupta | G10L 15/1815 |
| 2023/0162612 A1* | 5/2023 | Reed | G09B 7/08 434/322 |

* cited by examiner

*Primary Examiner* — Kang Hu
*Assistant Examiner* — Correll T French
(74) *Attorney, Agent, or Firm* — Joy S. Goudie (57) ABSTRACT

The embodiments herein disclose a method and system for intelligent interpretation of information to autonomously design in-class/hybrid/remote assessment. In an embodiment disclosed herein, involves picking up audio of the presenter from an audio input device such as microphone during an interaction. The interaction includes both either audio or video interaction. Further, the embodiment herein, involves extracting the key information present in the captured audio interaction and then use the extracted key information to intelligently generate assessments such as quiz questions, multiple-choice questions, and mathematical questions.

29 Claims, 5 Drawing Sheets

METHOD AND SYSTEM FOR INTELLIGENT INTERPRETATION OF INFORMATION TO AUTONOMOUSLY DESIGN IN-CLASS/HYBRID/REMOTE ASSESSMENT

BACKGROUND

Technical Field

The present invention is generally related to educational data analytics and machine learning. The present invention is particularly related to student engagement and analytics systems and methods with machine learning. The present invention is more particularly related to a system and method for assessing student engagement and enhancing a student's understanding in a subject.

Description of the Related Art

Academic institutions and other learning entities increasingly provide electronic learning materials, either to replace or supplement traditional, classroom pedagogical methods. While electronic learning materials are often convenient, effective, and efficient, their use can limit personal interactions between teachers and students. This lack of personal contact can make it difficult for academic institutions to determine whether students using electronic learning materials are engaged by the material, whether students are likely to succeed academically, and the like. Hence, student evaluation is critical in any mode of education.

Evaluating students is an important aspect in any mode of learning because the presenter has a better understanding of the students in a subject. As opposed to passive learning where the students just absorb like a sponge, active learning based on asking questions enhances understanding and helps them remember. However, if a student is learning from a computer system, the student does not have the luxury of having a question-and-answer dialog with the computer.

Asking questions not only focuses student's attention on the subject, it also fills gaps in their understanding. When students are learning through online mode, typically they cannot comprehend everything. As their misunderstanding grows, very soon students begin to lose track of the subject and their interest in the subject wanes. Similarly, they lose interest in reading a book with many individuals if they confuse their names. During those instances, asking questions to fill the gaps of misunderstanding might rekindle their interest in the subject or the book.

Furthermore, real-time quizzing of students who view a broadcast of live or recorded events can be a fun and interactive experience. Events may occur in games, sports, political events, news, or any other occurrence. A quiz may include one or more questions and may test the knowledge of or poll the audience member.

Hence there is a need for developing a system and method for conducting real-time quizzing and testing the students, to evaluate them. Furthermore, there is a need to track participant engagement or understanding of a certain topic when the students are part of a session, either in-person or remote.

The above-mentioned shortcomings, disadvantages and problems are addressed herein, which will be understood by reading and studying the following specification.

OBJECTS

The principal object of the embodiments disclosed herein is to provide a method and system for intelligent interpretation of information to autonomously design in-class/hybrid/remote assessment.

Another object of the embodiments disclosed herein is to track participant engagement or understanding of a certain topic when the students are part of a session held in-person or remote, or hybrid.

Yet another object of the embodiments disclosed herein is to provide a system and method to generate real-time questions during a session based on the content being discussed.

Yet another object of the embodiments disclosed herein is to utilize an AI-based system and method to categorize the course content and automatically generate questions from the interaction and publish the questions to all the participants during the session.

Yet another object of the embodiments disclosed herein is to provide a system and method that enables the participants to respond to the questions in real-time, thereby providing the host the opportunity to track the participants' engagement during the session.

Yet another object of the embodiments disclosed herein is to provide a system and method that enables the presenter to track the student who is persistently answering incorrectly during the session.

Yet another object of the embodiments disclosed herein is to provide a system and method which provides detailed classroom analytics, including the questions being asked during the session, class reports, lesson reports and student reports.

Yet another object of the embodiments disclosed herein is to provide a system and method that helps the presenter generate classroom performance and attention level reports for each individual student, which can then be shared with the student and his/her parents.

These and other objects and advantages of the present invention will become readily apparent from the following detailed description taken in conjunction with the accompanying drawings.

SUMMARY

The following details present a simplified summary of the embodiments disclosed herein and provide a basic understanding of the several aspects of the embodiments disclosed herein. This summary is not an extensive overview of the embodiments disclosed herein. It is not intended to identify key/critical elements of the embodiments disclosed herein or to delineate the scope of the embodiments disclosed herein. Its sole purpose is to present the concepts of the embodiments disclosed herein in a simplified form as a prelude to the more detailed description presented below.

The other objects and advantages of the embodiments disclosed herein will become readily apparent from the following description taken in conjunction with the accompanying drawings. It should be understood, however, that the following descriptions, while indicating the preferred embodiments and numerous specific details thereof, are given by way of illustration and not limitation. Many changes and modifications may be made within the scope of the embodiments disclosed herein without departing from the spirit thereof, and the embodiments disclosed herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments disclosed herein provide a system and method for intelligent interpretation of information to autonomously design in-class/hybrid/remote assessment. The method involves picking up the audio of the presenter from an audio input device such as a microphone during an interaction. The interaction includes either audio or video interaction. Further, the method involves extracting the key information present in the captured audio interaction and then using the extracted key information to intelligently generate assessments such as quiz questions, multiple-choice questions, and mathematical questions.

According to one embodiment disclosed herein, a method for intelligent interpretation of information to autonomously design in-class/hybrid/remote assessment is provided. The method includes receiving audio interaction of a presenter through an audio input device and uploading course content into a knowledge database. The method allows the presenter to optionally flag the significant keywords of the audio interaction while speaking into the audio input device through a plurality of means. The plurality of means comprise a specific key on a keyboard, a clicker device including mouse or a verbal cue spoken into the microphone. Furthermore, the plurality of means are used in real-time when the presenter wants to forcefully publish the question to the plurality of participants based on an important information just communicated. For instance, if the presenter is talking about the history of the world and mentions an important detail while talking, they (students) may click on the clicker, press a designated key on the keyboard, a click on the interface or say out a verbal cue such as "flag this" and the system will be able to generate a question or quiz from the recently communicated information to send to the participants. Moreover, the interaction comprises an audio or a video interaction, and the audio input device includes a microphone. The method further comprises capturing the audio interaction of the presenter by an audio capturing module.

The method further comprises transcribing the audio interaction along with the optionally flagged significant keywords by the presenter into text by an audio-text conversion module, and saving the transcribed text and course content in the knowledge database. The method further comprises analyzing the transcribed text by a text analyzation module. The text analyzation module further separates the last phrase or sentence, or piece of information of the transcribed text comprising the flagged significant keywords received from the presenter.

Furthermore, the method includes generating questions by a question generation module based on the course content presented by the presenter, followed by reviewing and seeking the approval of the presenter for the question generated by the question generation module. On reviewing the question, the presenter either approves or disapproves the question and publishes the approved question to a plurality of participants. In addition, if the presenter disapproves the question generated, then the question generation module, generates another question, seeks further approval from the presenter and if the presenter approves, publishes the another question to the plurality of participants. The method further involves saving the published question in the knowledge database. Once saved, the question is displayed to the plurality of participants to respond. Furthermore, the method involves generating analytics, auto-checking the responses of the plurality of participants, and displaying the analytics to the presenter by a response generation module. Following this, the presenter receives an alert if the plurality of participants persistently respond incorrectly to the published question. Finally, the method involves displaying the precise response to the plurality of participants, generating and storing detailed classroom analytics in the knowledge database.

According to one embodiment disclosed herein, transcribing the audio interaction into the plurality of text, by the audio-text conversion module, employs an automatic speech recognition system (ASR). The ASR is made up of statistical models that reflect the mapping of continuous phonetic sound sequences (spoken utterances or speech waveforms) to the plurality of text outputs that are recognized as human language. The ASR model further comprises a Language Model, a Pronunciation Model (Lexicon/Dictionary), and an Acoustic Model. In addition, the accuracy of the transcription improves whenever the models are consistently trained with fresh voice data from multiple speakers and a wider vocabulary (Language Model).

The accuracy is quantified statistically by the Word Error Rate (WER). Ideally, the WER equates to less than 11% for very accurate models. Quality of the dataset, audio, and lexicon are ultimately the most crucial factors while training a speech recognition model. Furthermore, the presenter can make audio information accessible with the aid of speech recognition. The audio has a lot of essential information that is hidden away, but it is difficult to look through. By using voice to text, audio is converted into text and made searchable on a word-by-word basis. As a result, the output can be utilized to index content archives in addition to existing metadata to improve the searchability of big archives and as automatic subtitles for those who have hearing loss.

According to one embodiment disclosed herein, the question generated by the question generation module includes generation of empirical or theoretical questions depending on the subject taught by the presenter. The empirical questions include mathematical questions or those that can be measured or calculated. For instance, when the presenter/teacher asks the plurality of participants/students to solve a mathematical question which has a unique or limited unique answers such as square root of 81, the response can be + or −9. Such questions when asked by the presenter/teacher would send out the question as fill in the blank, type short or long answer, etc.

Thus, the system will input information from the presenter and generate a question. The result of the question will also be automatically calculated using a separate system which may involve use of external tools, software, and service. Once the question has been generated, the question will be shared with the presenter and then once the presenter approves the question, the students will be able to solve the question. The students' response will be compared with the saved correct result. The theoretical questions include those questions that contain an important piece of information, including significant keywords. Furthermore, the method for generating question is provided. The method includes breaking the statement of the presenter into sentence structures, identifying intelligently the important piece of information in respective sentences, applying English grammar rules and machine learning NLP (Natural Language Processing) models, selecting the topic that matches the subject being taught by the presenter and creating the question. Moreover, while applying grammar rules and machine learning NLP models for generating questions, the following method is observed.

The method includes finding and marking a verb in a sentence and checking the type of verb in the sentence. The type of verb includes action verb and state of being verb or linking verb. The method further involves finding the subject and complement. Finding the complement includes finding the object of the action verb and finding the subject complement. The object of the action verb includes direct object and indirect object, and the subject complement includes predictive nominative and predictive adjective.

The predictive nominative comprises renaming the subject and predictive adjective comprises describing the subject. The method further involves saving the object of the action verb and subject complement in the knowledge database, finding the object of the action verb and subject in the course contents uploaded by the presenter in the knowledge database, and getting the type of sentence. The type of sentence includes simple and complex sentences. Finally, the method involves generating questions using English grammar rules for simple sentences and generating questions using machine learning NLP (Natural Language Processing) models for complex sentences.

For instance, during a lesson the presenter communicates the following information: "Mount Everest is the tallest peak in the world." In this sentence the important piece of information is "Mount Everest" and "tallest." The method will pick up subject, object, verb, and adjective. The method will then lock down to one piece of information, for instance, in this case, it may be "Mount Everest." Now, the method will use a third-party system to find reasonable alternates of this and generate a multiple-choice question. The alternates may be "Black mountain," "K2" or "Kangchenjunga". Further, the method will then send a question as follows to the presenter for approval: "___________" is the tallest mountain in the world:
  a) K2
  b) Mount Everest
  c) Black mountain
  d) Kangchenjunga According to one embodiment disclosed herein, the type of question generated by the question generation module includes a multiple-choice question, an information-based question, true/false questions, fill in the blanks questions, or short answer questions. Furthermore, the method provides the presenter to either set the time for the question being published, by having limited time for the plurality of participants to respond to the question, or the presenter may choose not to time the question.

According to one embodiment disclosed herein, the plurality of participants attend the session via various modes, including in-class, hybrid, or remotely. The method allows the plurality of participants to respond to the questions by typing, clicking, or by dictating, if attending remotely. Furthermore, after participants respond to the question, an automatic report is generated, saved, and displayed to the presenter. The automatic report is then displayed to the presenter in graphical format based on the percentage of the participants choosing to submit a certain response during the session. In addition, the presenter also has the option to track the effectiveness of the session while conducting the session. Furthermore, auto-checking the responses of the plurality of participants by the response generation module is carried out using external tools, software, or service.

According to one embodiment herein, detailed classroom analytics comprises a detailed report of the questions published, class reports, course content reports, and student reports. The detailed classroom analytics is stored in the knowledge database and is populated after every session and an aggregate. The detailed classroom analytics is available to the presenter as the session continues to happen. Furthermore, the detailed classroom analytics generated by the response generator module enables the presenter to identify poor student performance and helps build a better future content. The detailed classroom analytics further enables the presenter to generate classroom performance and attention level reports for each of the participants. The attention level reports are shared with the parents of the participants or students.

According to one embodiment disclosed herein, a computer implemented system comprising instructions stored on a non-transitory computer readable storage medium and executed on a hardware processor for intelligent interpretation of information to autonomously design in-class/hybrid/remote assessment is provided. The system comprises an audio input device configured to receive an audio interaction of a presenter. The audio interaction comprises significant keywords that are optionally flagged by the presenter through a plurality of means. The interaction includes an audio or a video interaction. The audio input device includes a microphone. Furthermore, the plurality of means comprise a specific key on a keyboard, a clicker device including mouse or a verbal cue spoken into the microphone. The plurality of means are used in real-time when the presenter wants to forcefully publish the question to the plurality of participants based on an important information just communicated.

For instance, if the presenter is talking about the history of the world and mentions an important detail while talking, they (students) may click on the clicker, press a designated key on the keyboard, a click on the interface or say out a verbal cue such as "flag this" and the system will generate a question or quiz from the recently communicated information to send to the participants. The system further includes an audio capturing module configured to capture the audio interaction of the presenter; an audio-text conversion module configured to transcribe the audio interaction and the optionally flagged significant keywords by the presenter, into text.

In addition, the system further comprises a knowledge database configured to maintain the transcribed text and course content uploaded by the presenter. Furthermore, the system comprises a text analyzation module configured to analyze the transcribed text, and separate the last phrase or sentence or piece of information of the flagged significant keywords received from the presenter. The system also includes a question generation module configured to generate at least one question based on the course content presented by the presenter. The question generated is further subjected to review and approval from the presenter. The question approved by the presenter is then published by the question generation module to a plurality of participants for responding.

Furthermore, the question generation module is configured to generate another question, seek approval from the presenter and publish the question to the plurality of participants for responding, on disapproval of the previous question by the presenter. Furthermore, the system comprises a response generation module configured to generate analytics, auto-check the responses of the plurality of participants and display the analytics to the presenter. The response generation module is further configured to send an alert to the presenter if the plurality of participants persistently respond incorrectly, display the precise response to the plurality of participants, and generate and store detailed classroom analytics in the knowledge database.

According to one embodiment disclosed herein, the audio-text conversion module configured to transcribe the audio interaction into text, employs an automatic speech recognition system (ASR). The ASR is made up of statistical models that reflect the mapping of continuous phonetic sound sequences (spoken utterances or speech waveforms) to the plurality of text outputs that are recognized as human language. The ASR model comprises a Language Model, a Pronunciation Model (Lexicon/Dictionary), and an Acoustic Model. In addition, the accuracy of the transcription improves whenever the models are consistently trained with fresh voice data from multiple speakers and a wider vocabulary (Language Model). Thus, the accuracy is quantified statistically by the Word Error Rate (WER). Ideally, the WER equates to less than 11% for very accurate models. Quality of the dataset, audio, and lexicon are ultimately the most crucial factors while training a speech recognition model. Furthermore, the presenter can make audio information accessible with the aid of speech recognition. The audio has a lot of essential information that is hidden away, but it is difficult to look through. By using voice to text, audio is converted into text and made searchable on a word-by-word basis. As a result, the output can be utilized to index content archives in addition to existing metadata to improve the searchability of big archives and as automatic subtitles for those who have hearing loss.

According to one embodiment disclosed herein, the question generated by the question generation module includes empirical or theoretical questions depending on the subject taught by the presenter. The empirical questions include mathematical questions or those that can be measured or calculated. For instance, when the presenter/teacher asks the plurality of participants/students to solve a mathematical question which has a unique or limited unique answers such as square root of 81, the response can be + or −9. Such questions, when asked by the presenter/teacher would send out the question as fill in the blank, type short or long answer, etc. Thus, the system will input information from the presenter and generate a question. The result of the question will also be automatically calculated using a separate system which may involve use of external tools, software, or service.

Once the question has been generated, the question will be shared with the presenter and then once the presenter approves the question, the students will be able to solve the question. The students' response will be compared with the saved correct result. The theoretical questions include those questions that contain an important piece of information, including significant keywords.

According to one embodiment disclosed herein, the questions generated by the question generation module include a multiple-choice question, an information-based question, true/false questions, fill in the blanks questions, or short answer questions. Furthermore, the system provides the presenter to either set the time for the question being published, by having limited time for the plurality of participants to respond to the question, or the presenter may choose not to time the question.

According to one embodiment disclosed herein, the plurality of participants attend the session using various modes, including in-class, hybrid, or remotely. The system further provides the plurality of participants to respond to the questions by typing, clicking, or by dictating, if attending remotely. Furthermore, after the participants respond to the question, an automatic report is generated, saved, and displayed to the presenter. The automatic report is then displayed to the presenter in graphical format based on a percentage of the participants choosing to submit a certain response during the session. In addition, the presenter also has the option to track the effectiveness of the session while conducting the session. Furthermore, the response generation module is configured to auto-check the responses of the participants using external tools, software, or service.

According to one embodiment disclosed herein, the response generation module is configured to generate detailed classroom analytics comprising a detailed report of the questions published, class reports, course content reports and student reports. The detailed classroom analytics is stored in the knowledge database and is populated after every session and is available to the presenter as the session continues to happen. Furthermore, the detailed classroom analytics generated by the response generator module enables the presenter to identify poor student performance and helps build a better future content. The detailed classroom analytics also enables the presenter to generate classroom performance and attention level reports for each of the participants. The attention level reports are shared with the parents of the participants.

According to one embodiment disclosed herein, the system further enables the presenter to evaluate his/her own performance by generating aggregate engagement score of the plurality of participants. If the aggregate engagement score is high for the plurality of participants, then the presenter is doing a good job and if the aggregate engagement score for the plurality of participants is below par, then the presenter is notified about the overall below par lesson delivery.

The foregoing summary is illustrative only and is not intended to be in any way limiting. In addition to the illustrative aspects, embodiments, and features described above, further aspects, embodiments, and features will become apparent by reference to the drawings and the following detailed description.

According to one embodiment herein, these and other aspects of the embodiments disclosed herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others, this is done for convenience only as each feature may be combined with any or all of the other features in accordance with the present invention.

DETAILED DESCRIPTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The various embodiments disclosed herein provide a system and method for intelligent interpretation of information to autonomously design in-class/hybrid/remote assessment. The method involves picking up audio of a presenter from an audio input device such as a microphone during an interaction. The interaction includes either audio or video interaction. Further, the method involves extracting the key information present in the captured audio interaction and then using the extracted key information to intelligently generate assessments such as quiz questions, multiple-choice questions, and mathematical questions.

According to one embodiment disclosed herein, a method for intelligent interpretation of information to autonomously design in-class/hybrid/remote assessment is provided. The method includes receiving audio interaction of a presenter through an audio input device and uploading course content into a knowledge database. The method allows the presenter to optionally flag the significant keywords of the audio interaction while speaking into the audio input device through a plurality of means. The plurality of means comprise a specific key on a keyboard, a clicker device including mouse or a verbal cue spoken into the microphone.

Furthermore, the plurality of means are used in real-time when the presenter wants to forcefully publish the question to the plurality of participants based on an important information just communicated. For instance, if the presenter is talking about the history of the world and mentions an important detail while talking, they (students) may click on the clicker, press a designated key on the keyboard, a click on the interface or say out a verbal cue such as "flag this" and the system will generate a question or quiz from the recently communicated information to send to the participants. Moreover, the interaction comprises an audio or a video interaction and the audio input device includes a microphone.

The method further comprises capturing the audio interaction of the presenter by an audio capturing module, and then transcribing the audio interaction along with the optionally flagged significant keywords by the presenter into text by an audio-text conversion module and saving the transcribed text and course content in the knowledge database. The method further comprises analyzing the transcribed text by a text analyzation module. The text analyzation module further separates the last phrase or sentence, or piece of information of the transcribed text comprising the flagged significant keywords received from the presenter. Furthermore, the method includes generating questions by a question generation module based on the course content presented by the presenter followed by reviewing and seeking approval of the presenter for the questions generated by the question generation module.

On reviewing the questions, the presenter either approves or disapproves the questions and publishes the approved questions to a plurality of participants. In addition, if the presenter disapproves any of the questions generated, then the question generation module generates another question, seeks approval from the presenter and publishes the approved question to the plurality of participants. The method further involves saving the published question in the knowledge database. Once saved, the question is displayed to the plurality of participants to respond. Furthermore, the method involves generating analytics, auto-checking the responses of the plurality of participants, and displaying the analytics to the presenter by a response generation module. Following this, the presenter receives an alert if the participants persistently respond incorrectly to the published question. Finally, the method involves displaying the precise response to the participants, generating and storing detailed classroom analytics in the knowledge database.

According to one embodiment disclosed herein, transcribing the audio interaction into text, by the audio-text conversion module, employs an automatic speech recognition system (ASR). The ASR is made up of statistical models that reflect the mapping of continuous phonetic sound sequences (spoken utterances or speech waveforms) to the plurality of text outputs that are recognized as human language. The ASR model further comprises a Language Model, a Pronunciation Model (Lexicon/Dictionary), and an Acoustic Model. In addition, the accuracy of the transcription improves whenever the models are consistently trained with fresh voice data from multiple speakers and a wider vocabulary (Language Model). Thus, the accuracy is quantified statistically by the Word Error Rate (WER). Ideally, the WER equates to less than 11% for very accurate models. Quality of the dataset, audio, and lexicon are ultimately the most crucial factors while training a speech recognition model.

Furthermore, the presenter can make audio information accessible with the aid of speech recognition. The audio has a lot of essential information that is hidden away, but it is difficult to look through. By using voice to text, audio is converted into text and made searchable on a word-by-word basis. As a result, the output can be utilized to index content archives in addition to existing metadata to improve the searchability of big archives and as automatic subtitles for those who have hearing loss. For instance, a journalist is searching for video to use in a piece he is writing. The journalist can seek the footage based on terms regarding the incident instead of attempting to determine the exact date that an event occurred.

According to one embodiment disclosed herein, the questions generated by the question generation module include empirical or theoretical questions depending on the subject taught by the presenter. The empirical questions include mathematical questions or those that can be measured or calculated. For instance, when the presenter/teacher asks the plurality of participants/students to solve a mathematical question which has a unique or limited unique answers such as square root of 81, the response can be + or −9. Such questions when asked by the presenter/teacher would send out the question as fill in the blank, type short or long answer, etc. Thus, the system will input information from the presenter and generate a question. The result of the question will also be automatically calculated using a separate system which may involve use of external tools, software, or service.

Once the question has been generated, the question will be shared with the presenter and then once the presenter approves the question, the students will be able to solve the question. The students' response will be compared with the saved correct result. The theoretical questions include those questions that contain an important piece of information, including significant keywords. Furthermore, the method for generating question is provided. The method includes breaking the statement of the presenter into sentence structures, identifying intelligently the important piece of information in the respective sentences, applying English grammar rules and machine learning NLP (Natural Language Processing) models, selecting the topic that matches the subject being taught by the presenter and creating the question. Moreover, while applying grammar rules and machine learning NLP models for generating questions, the following method is observed. The method includes finding and marking a verb in a sentence, checking the type of verb in the sentence. The type of verb includes action verb and state of being verb or linking verb.

The method further involves finding the subject and complement. Finding the complement includes finding the object of the action verb and finding the subject complement. The object of the action verb includes direct object and indirect object, and the subject complement includes predictive nominative and predictive adjective. The predictive nominative comprises renaming the subject and predictive adjective comprises describing the subject. The method further involves saving the object of the action verb and subject complement in the knowledge database, finding the object of the action verb and subject in the course contents uploaded by the presenter in the knowledge database, and getting the type of sentence. The type of sentence includes simple and complex sentences.

Finally, the method involves generating questions using English grammar rules for simple sentences and generating questions using machine learning NLP (Natural Language Processing) models for complex sentences. For instance, during a lesson the presenter communicates the following information: "Mount Everest is the tallest peak in the world". In this sentence, the important piece of information is "Mount Everest" and "tallest". The method will pick up subject, object, verb, adjective. The method will then lock down to one piece of information, for instance, in this case, it may be "Mount Everest". Now the method will use a third-party system to find reasonable alternates of this and generate a multiple-choice question. The alternates may be "Black mountain," "K2" or "Kangchenjunga". Further, the method will then send a question as follows to the presenter for approval: "__________" is the tallest mountain in the world:
a) K2
b) Mount Everest
c) Black mountain
d) Kangchenjunga For instance, if the presenter is teaching a topic relating to physics subject and the presenter mentions the following detail, "Sir Isaac Newton discovered gravity" and flags this detail as important, then the method will highlight the elements such as: Sir Isaac Newton; Discovered, and Gravity. Then the method uses artificial intelligence (AI) to generate the following question:
Sir Isaac Newton discovered "__________."
a) Electricity
b) Thermal Radiation
c) String theory
d) Gravity The presenter would be able to see the question and approve it before it is sent to the plurality of participants. Furthermore, the method can also generate true/false kind of questions. For instance, if the presenter is teaching the following: "There are a total of 9 national parks in California" and flags this as important. Then the method generates the following question:
There are a total of 7 national parks in California.
a) True
b) False The teacher will approve or disapprove the question so that it can then be sent out to all the participants.

According to one embodiment disclosed herein, the questions generated by the question generation module includes a multiple-choice question, an information-based question, true/false questions, fill in the blanks questions, or short answer questions. Furthermore, the method enables the presenter to either set the time for the question being published, by having limited time for the plurality of participants to respond to the question, or the presenter may choose not to time the question.

According to one embodiment disclosed herein, the plurality of participants attend the session in various modes, including in-class, hybrid, or remotely. The method allows the participants to respond to the questions by typing, clicking, or by dictating, if attending remotely. Furthermore, after the participants respond to the question, an automatic report is generated, saved and displayed to the presenter. The automatic report is then displayed to the presenter in graphical format based on the percentage of the participants choosing to submit a certain response during the course of session. In addition, the presenter also has the option to track the effectiveness of the session while conducting the session. Furthermore, auto-checking of the responses of the plurality of participants by the response generation module is carried out using external tools, software, or service.

According to one embodiment disclosed herein, the detailed classroom analytics comprises a detailed report of the questions published, class reports, course content reports, and student reports. The detailed classroom analytics is stored in the knowledge database and is populated after every session and an aggregate. The detailed classroom analytics is available to the presenter as the session continues to happen. Furthermore, the detailed classroom analytics generated by the response generator module enables the presenter to identify poor performance by students and helps build a better future content. The detailed classroom analytics further enables the presenter to generate classroom performance and attention level reports for each of the plurality of participants. The attention level reports are shared with the parents of the participants or students.

According to one embodiment disclosed herein, a computer implemented system comprising instructions stored on a non-transitory computer readable storage medium and executed on a hardware processor for intelligent interpretation of information to autonomously design in-class/hybrid/remote assessment is provided. The system comprises an audio input device configured to receive an audio interaction of a presenter. The audio interaction comprises significant keywords that are optionally flagged by the presenter through a plurality of means. The interaction includes an audio or a video interaction. The audio input device includes a microphone. Furthermore, the plurality of means comprise a specific key on a keyboard, a clicker device including mouse or a verbal cue spoken into the microphone. The plurality of means are used in real-time when the presenter wants to forcefully publish the question to the plurality of participants based on an important information just communicated. For instance, if the presenter is talking about the history of the world and mentions an important detail while talking, they (students) may click on the clicker, press a designated key on the keyboard, a click on the interface, or say out a verbal cue such as "flag this," and the system will generate a question or quiz from the recently communicated information to send to the participants.

The system further includes an audio capturing module configured to capture the audio interaction of the presenter; an audio-text conversion module configured to transcribe the audio interaction and the optionally flagged significant keywords by the presenter, into text. In addition, the system further comprises a knowledge database configured to maintain the transcribed text and course content uploaded by the presenter. Furthermore, the system comprises a text analyzation module configured to analyze the transcribed text, and separate the last phrase or sentence or piece of information of the flagged significant keywords received from the presenter.

The system also includes a question generation module configured to generate questions based on the course content presented by the presenter. The question generated is further subjected to review and approval from the presenter. The question approved by the presenter is then published by the question generation module to a plurality of participants for responding. Furthermore, the question generation module is configured to generate another question, seek approval from the presenter and publish the approved question to the plurality of participants for responding, on disapproval of the previous question by the presenter. Furthermore, the system comprises a response generation module configured to generate analytics, auto-check the responses of the plurality of participants, and display the analytics to the presenter. The response generation module is further configured to send an alert to the presenter if the plurality of participants persistently respond incorrectly, display the precise response to the plurality of participants, and generate and store detailed classroom analytics in the knowledge database.

According to one embodiment disclosed herein, the audio-text conversion module, configured to transcribe the audio interaction into the plurality of text, employs an automatic speech recognition system (ASR). The ASR is made up of statistical models that reflect the mapping of continuous phonetic sound sequences (spoken utterances or speech waveforms) to the plurality of text outputs that are recognized as human language. The ASR model comprises a Language Model, a Pronunciation Model (Lexicon/Dictionary), and an Acoustic Model. In addition, the accuracy of the transcription improves whenever the models are consistently trained with fresh voice data from multiple speakers and a wider vocabulary (Language Model). Thus, the accuracy is quantified statistically by the Word Error Rate (WER). Ideally, the WER equates to less than 11% for very accurate models. Quality of the dataset, audio, and lexicon are ultimately the most crucial factors while training a speech recognition model. Furthermore, the presenter can make audio information accessible with the aid of speech recognition. The audio has a lot of essential information that is hidden away, but it is difficult to look through. By using voice to text, audio is converted into text and made searchable on a word-by-word basis. As a result, the output can be utilized to index content archives in addition to existing metadata to improve the searchability of big archives and serve as automatic subtitles for those who have hearing loss.

According to one embodiment disclosed herein, the questions generated by the question generation module include empirical or theoretical questions depending on the subject taught by the presenter. The empirical questions include mathematical questions or those that can be measured or calculated. For instance, when the presenter/teacher asks the plurality of participants/students to solve a mathematical question which has a unique or limited unique answers such as square root of 81, the response can be + or −9. Such questions when asked by the presenter/teacher would send out the question as fill in the blank, type short or long answer, etc. Thus, the system will input information from the presenter and generate a question. The result of the question will also be automatically calculated using a separate system which may involve use of external tools, software, or service. Once the question has been generated, the question will be shared with the presenter and then once the presenter approves the question, the students will be able to solve the approved question. The students' response will be compared with the saved correct result. The theoretical questions include those questions that contain an important piece of information, including significant keywords.

According to one embodiment disclosed herein, the questions generated by the question generation module includes a multiple-choice question, an information-based question, true/false questions, fill in the blank's questions or short answer questions. Furthermore, the system provides the presenter to either set the time for the question being published, by having limited time for the plurality of participants to respond to the question, or the presenter may choose not to time the question.

According to one embodiment disclosed herein, the plurality of participants can attend the session using various modes, including in-class, hybrid or remotely. The system further provides the participants to respond to the questions by typing, clicking, or by dictating if attending remotely. Furthermore, after the participants respond to the question, an automatic report is generated, saved and displayed to the presenter. The automatic report is then displayed to the presenter in graphical format based on the percentage of the participants choosing to submit a certain response during the course of session. In addition, the presenter also has the option to track the effectiveness of the session while conducting the session. Furthermore, the response generation module is configured to auto-check the responses of the participants using external tools, software, or service.

According to one embodiment disclosed herein, the response generation module is configured to generate detailed classroom analytics comprising a detailed report of the questions published, class reports, course content reports, and student reports. The detailed classroom analytics is stored in the knowledge database and is populated after every session, and is available to the presenter as the session continues to happen. Furthermore, the detailed classroom analytics generated by the response generator module enables the presenter to identify poor student performance and helps build better future content. The detailed classroom analytics also enables the presenter to generate classroom performance and attention level reports for each of the participants. The attention level reports are shared with the parents of the participants.

According to one embodiment disclosed herein, the system further enables the presenter to evaluate his/her own performance by generating aggregate engagement score of the plurality of participants. If the aggregate engagement score is high for the plurality of participants, then the presenter is doing a good job and if the aggregate engagement score for the plurality of participants is below par, then the presenter is notified about the overall below par lesson delivery.

Figure 1:
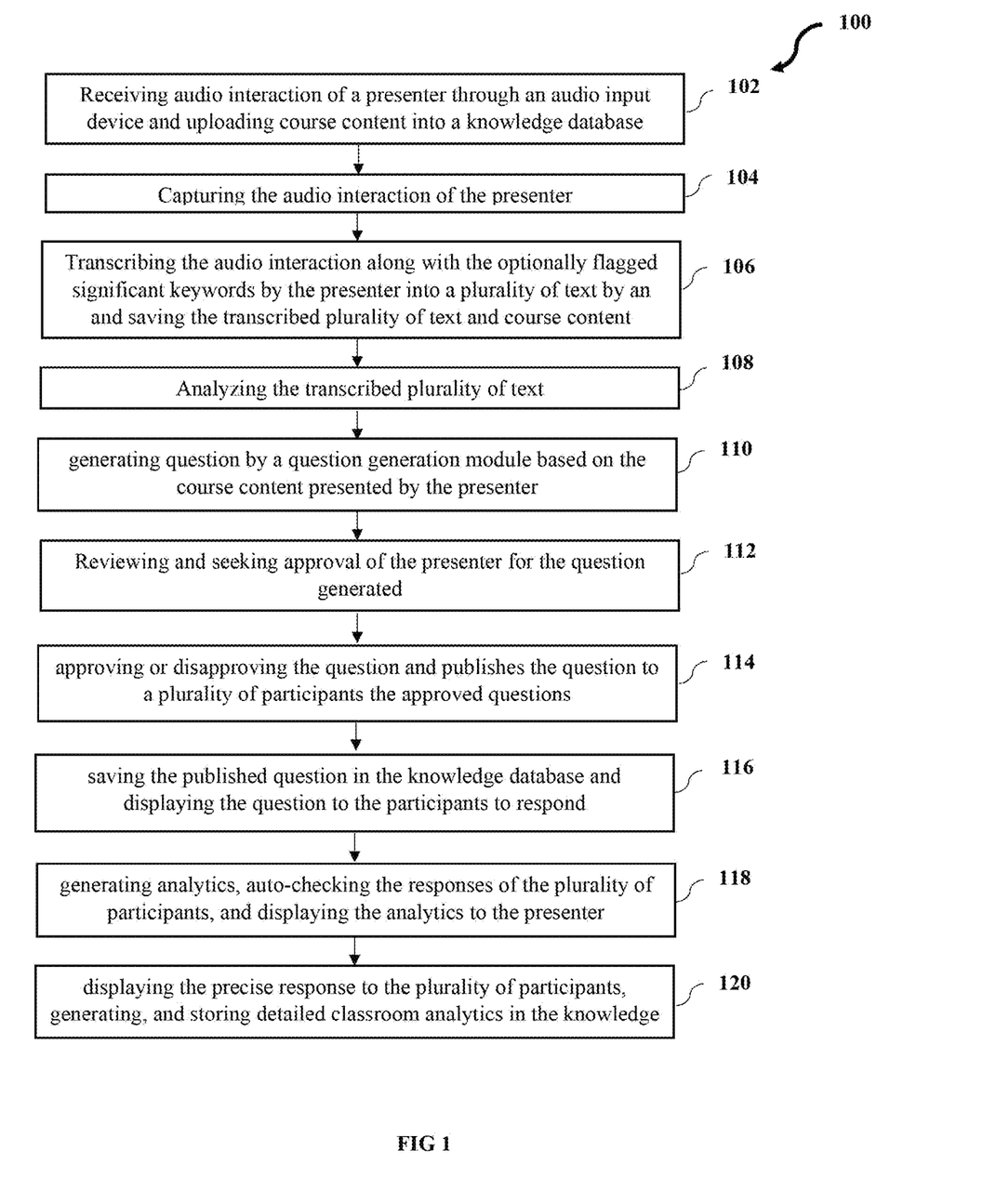
FIG. 1 illustrates a flowchart depicting a method for intelligent interpretation of information to autonomously design in-class/hybrid/remote assessment, according to an embodiment disclosed herein.

FIG. 1 illustrates a flowchart depicting a method for intelligent interpretation of information to autonomously design in-class/hybrid/remote assessment, according to an embodiment disclosed herein. A method 100 for intelligent interpretation of information to autonomously design in-class/hybrid/remote assessment is provided. The method 100 includes receiving audio interaction of a presenter through an audio input device and uploading course content into a knowledge database at step 102. The method 100 allows the presenter to optionally flag the significant keywords of the audio interaction while speaking into the audio input device through a plurality of means at step 102. The plurality of means comprise a specific key on a keyboard, a clicker device including mouse or a verbal cue spoken into the microphone.

Furthermore, the plurality of means are used in real-time, when the presenter wants to forcefully publish the question to the plurality of participants based on important information just communicated. Moreover, interaction comprises an audio or a video interaction and the audio input device includes a microphone. The method 100 further comprises capturing the audio interaction of the presenter by an audio capturing module at step 104. Then, at step 106, an audio-text conversion module transcribes the audio interaction along with optionally flagged significant keywords by the presenter into and saves the transcribed text and course content in the knowledge database. The method 100 further comprises analyzing the transcribed text by a text analyzation module at step 108. The text analyzation module, further separates the last phrase or sentence or piece of information of the transcribed text comprising the flagged significant keywords received from the presenter.

Furthermore, the method 100 includes generating questions by a question generation module based on the course content presented by the presenter at step 110, followed by reviewing and seeking approval of the presenter for the question generated by the question generation module at step 112. On reviewing the question, the presenter either approves or disapproves the question and publishes to a plurality of participants the approved questions at step 114. In addition, if the presenter disapproves the question generated, then the question generation module generates another question, seeks approval from the presenter and publishes the approved question to the plurality of participants. The method 100 further involves saving the published question in the knowledge database at step 116. Once saved, the question is displayed to the plurality of participants to respond. Furthermore, the method 100 involves generating analytics, auto-checking the responses of the plurality of participants, and displaying the analytics to the presenter by a response generation module at step 118. Following this, the presenter receives an alert if the plurality of participants persistently respond incorrectly to the published question. Finally, the method 100 involves displaying the precise response to the plurality of participants, generating and storing detailed classroom analytics in the knowledge database at step 120.

Figure 2:
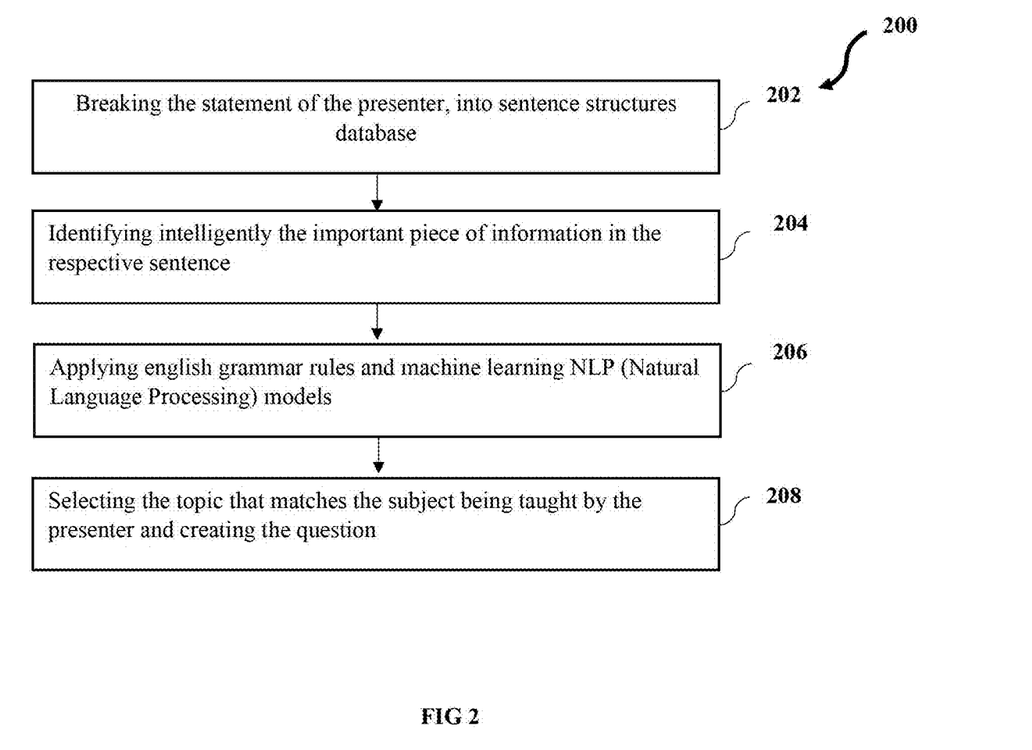
FIG. 2 illustrates a flowchart depicting a method for generating the questions, according to an embodiment disclosed herein.

According to one embodiment disclosed herein, FIG. 2 illustrates a flowchart depicting a method for generating the questions. FIG. 2 illustrates the method 200 of generating the questions. The method 200 includes breaking the statement of the presenter into sentence structures at step 202. Then, step 204 involves identifying intelligently the important piece of information in respective sentences. The method 200 further involves applying English grammar rules and machine learning NLP (Natural Language Processing) models at step 206, followed by selecting the topic that matches the subject taught by the presenter, and creating the questions at step 208.

Figure 3:
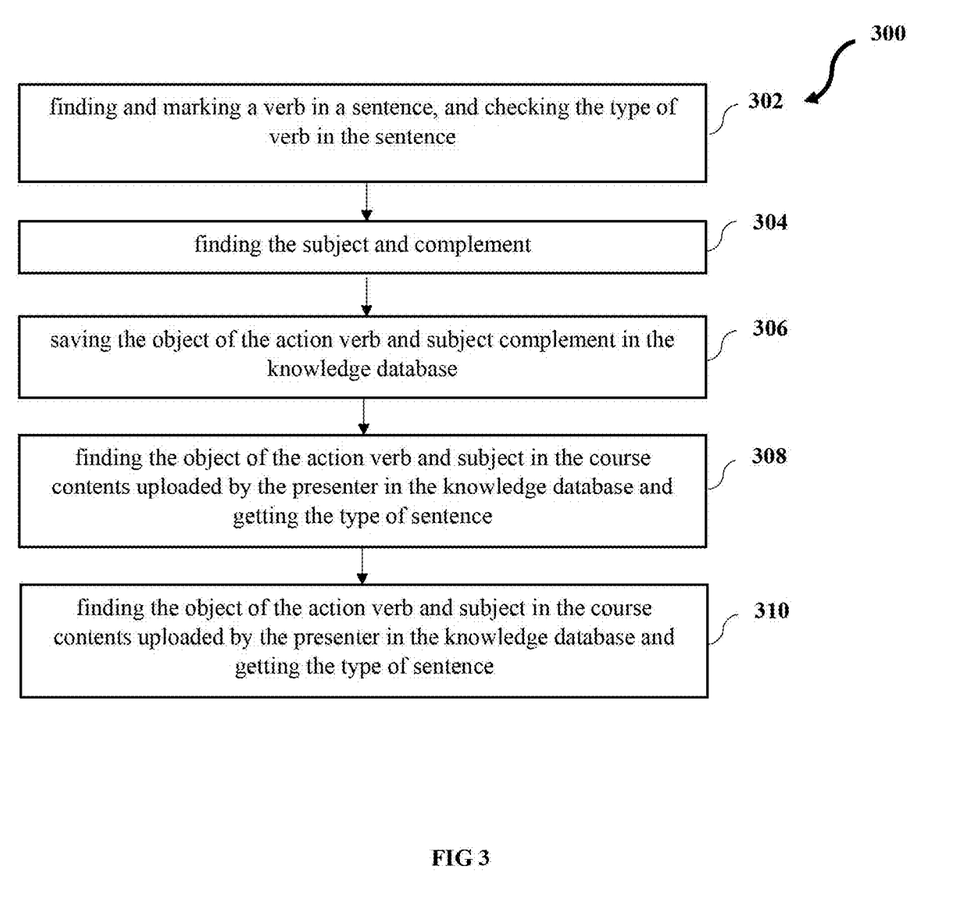
FIG. 3 illustrates a flowchart depicting a method for applying grammar rules and machine learning NLP models for generating questions, according to an embodiment disclosed herein.

According to one embodiment disclosed herein, FIG. 3 illustrates a flowchart depicting a method for applying grammar rules and machine learning NLP models for generating questions. FIG. 3 illustrates the method 300 for applying grammar rules and machine learning NLP models for generating questions. The method 300 comprises finding and marking a verb in a sentence and checking the type of verb in the sentence at step 302. The type of verb includes action verb and state of being verb or linking verb. The method 300 further involves finding the subject and complement at step 304. Finding the complement includes finding the object of the action verb and finding the subject complement. The object of the action verb includes direct object and indirect object, and the subject complement includes predictive nominative and predictive adjective. The predictive nominative comprises renaming the subject and predictive adjective comprises describing the subject.

The method 300 further involves saving the object of the action verb and subject complement in the knowledge database at step 306. Furthermore, the method 300 involves finding the object of the action verb and subject in the course contents uploaded by the presenter in the knowledge database and getting the type of sentence at step 308. The type of sentence includes simple and complex sentences. Finally, the method 300 involves generating questions using English grammar rules for simple sentences and generating questions using machine learning NLP (Natural Language Processing) models for complex sentences at step 310.

Figure 4:
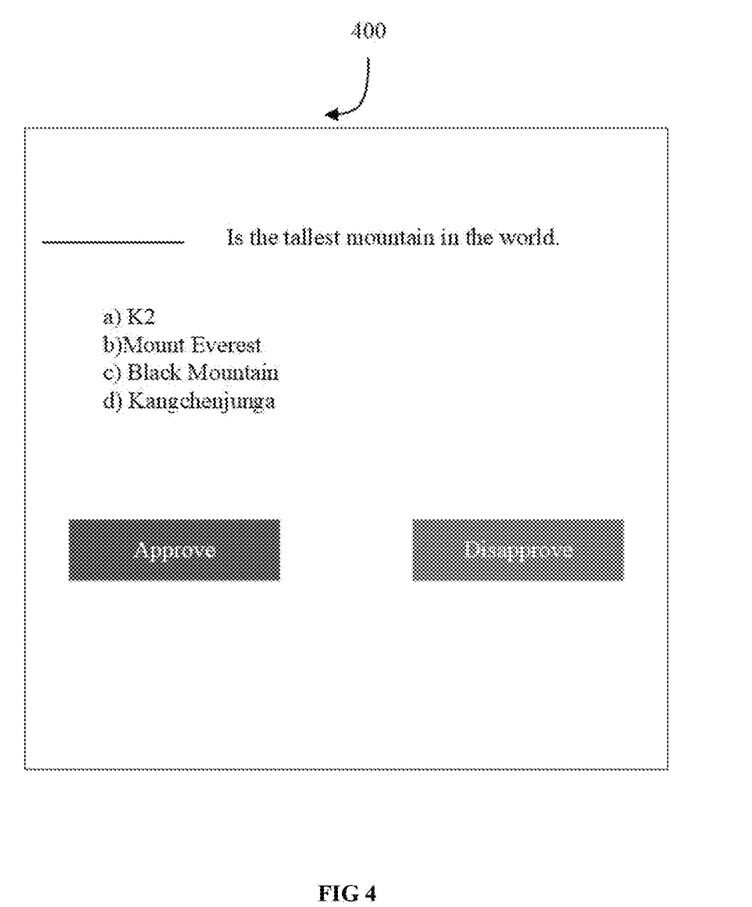
FIG. 4 illustrates a screenshot of the method for publishing the multiple-choice question to the presenter for approval, according to an embodiment disclosed herein.
Figure 5:
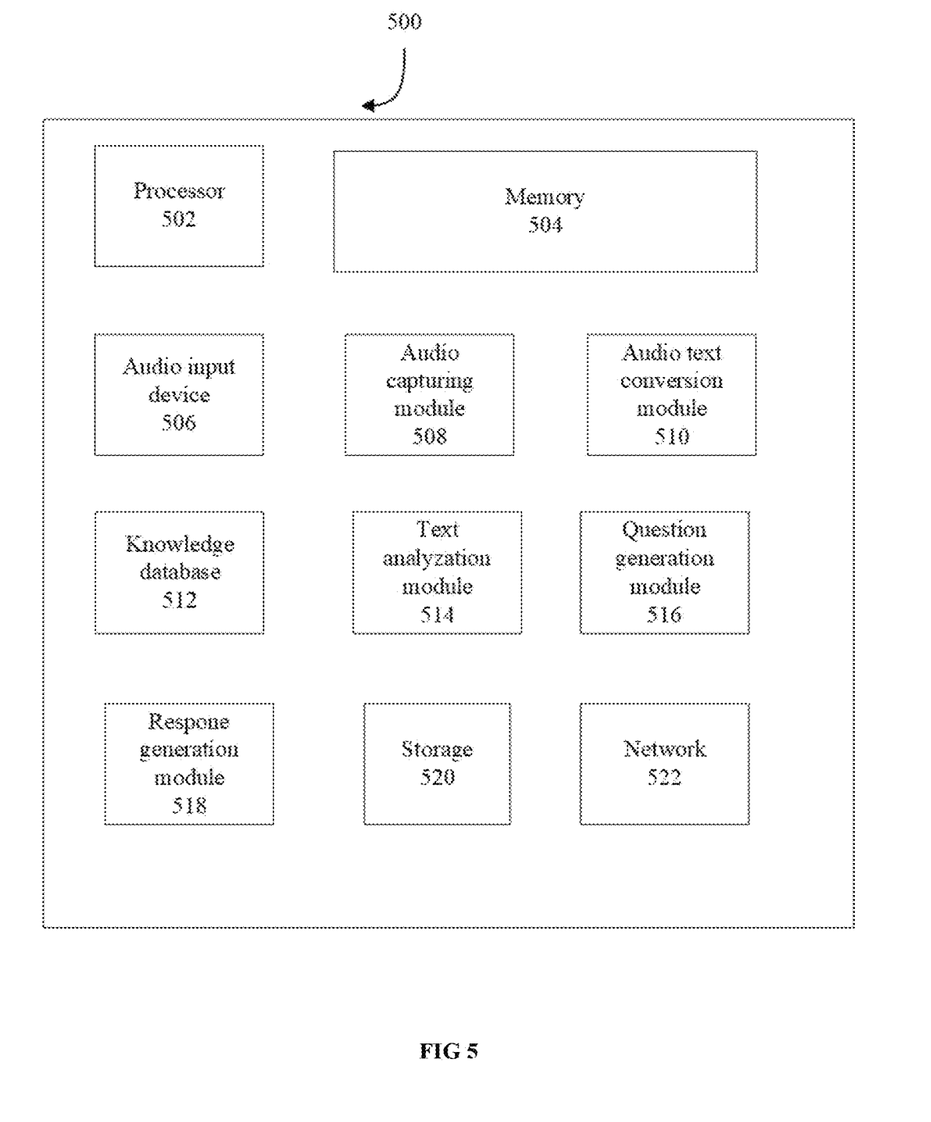
FIG. 5 illustrates the block diagram of a system for intelligent interpretation of information to autonomously design in-class/hybrid/remote assessment, according to an embodiment disclosed herein.

According to one embodiment herein, FIG. 4 illustrates a screenshot of the method for publishing the multiple-choice question to the presenter for approval. FIG. 4, denoted by reference numeral 400, illustrates the screenshot of method of publishing the multiple-choice question to the presenter for approval. For instance, the screenshot 400 includes the statement "Mount Everest is the tallest peak in the world". In this sentence, the important piece of information is "Mount Everest" and "tallest." The method will pick up subject, object, verb, and adjective. The method will then lock down to one piece of information. For instance, in this case, it may be "Mount Everest." Now the method will use a third-party system to find reasonable alternates of this and generate a multiple-choice question. The alternates may be "Black mountain", "K2," or "Kangchenjunga". Further, the method will then send a question as follows to the presenter for approval: "________" is the tallest mountain in the world:
e) K2
f) Mount Everest
g) Black mountain
h) Kangchenjunga According to one embodiment herein, FIG. 5 illustrates the block diagram of a system for intelligent interpretation of information to autonomously design in-class/hybrid/remote assessment. FIG. 5 illustrates a computer implemented system 500 comprising instructions stored on a non-transitory computer readable storage medium 520 and executed on a hardware processor 502 for intelligent interpretation of information to autonomously design in-class/hybrid/remote assessment. The system 500 comprises an audio input device 506 configured to receive an audio interaction of a presenter.

The audio interaction comprises of significant keywords that is optionally flagged by the presenter through a plurality of means. The audio interaction includes an audio or a video interaction. The audio input device 506 includes a microphone. Furthermore, the plurality of means comprise a specific key on a keyboard, a clicker device including mouse or a verbal cue spoken into the microphone. The plurality of means are used in real-time, when the presenter wants to forcefully publish the question to the plurality of participants based on an important information just communicated. The system 500 further includes an audio capturing module 508, configured to capture the audio interaction of the presenter. The system 500 also comprises an audio-text conversion module 510 configured to transcribe the audio interaction and the optionally flagged significant keywords by the presenter, into text. In addition, the system 500 further comprises a knowledge database 512 configured to maintain the transcribed text and course content uploaded by the presenter.

Furthermore, the system 500 comprises a text analyzation module 514 configured to analyze the transcribed text and separate the last phrase or sentence or piece of information of the flagged significant keywords received from the presenter. The system 500 also includes a question generation module 516 configured to generate question based on the course content presented by the presenter. The question generated is further subjected to review and approval from the presenter. The question approved by the presenter is then published by the question generation module 516 to a plurality of participants for responding. Furthermore, the question generation module 516 is configured to generate another question, seek approval from the presenter and publish the approved question to the plurality of participants for responding, on disapproval of previous question by the presenter. Furthermore, the system 500 comprises a response generation module 518 configured to generate analytics, auto-check the responses of the plurality of participants and display the analytics to the presenter. The response generation module 518 is further configured to send an alert to the presenter, if the plurality of participants persistently respond incorrectly, display the precise response to the plurality of participants, and generate and store detailed classroom analytics in the knowledge database 512.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however that it is not intended to limit the disclosure to the forms disclosed, but on the contrary, the disclosure is to cover all modifications, equivalents, and alternatives falling within the scope of the disclosure.

TECHNICAL ADVANTAGES

The embodiments described above disclose a system and method for intelligent interpretation of information to autonomously design in-class/hybrid/remote assessment in video and audio conferencing. The system includes a software platform to enable students to concentrate on important piece of information and parallelly evaluate their attention level. The system enables the presenter/teacher to flag the sentence or line of importance while giving the session. Once a flag has been raised, the system will interpret and transcribe the information that the teacher is mentioning and save that line. Further, the system will identify main parts of the flagged line which includes at least one of a subject, object, or verb, and finds alternates of a similar type of part of the line for at least one of the subject, object, or verbs, using any standard search systems. Furthermore, the system creates an assessment that includes one or more questions, including but not be limited to, multiple-choice question and push it out automatically to evaluate the student engagement.

Hence, the primary objective of the embodiments described above is to track the participant engagement or understanding of a certain topic when they are part of session (in-person or remote). The embodiments described hereinabove also envisage generating questions on the go during a session based on the content being discussed within the session. Furthermore, the system also employs AI or Artificial Intelligence to categorize the content into topics and to generate quiz-based questions from speech. The questions are then sent to all the participants of that session during the meeting. The participants respond to the question and the host gets to track the participants' engagement during course of session.

Moreover, the embodiments described above also find application beyond classroom, such as during interviews, where a person is questioned based on what is being discussed, in courts or interrogations, which enables the person to respond to auto-generated questions based on his/her own words or based on what is being interrogated upon. The embodiments described above also find application in truth detection system or devices, where a person can be repeatedly posted questions out of his/her own words. Furthermore, the embodiments described hereinabove can also be used to generate questionnaires based on videos/movies, in MOOCs (massive open online courses) and related online courseware. Additionally, the embodiments described hereinabove are also used in integrating software/solutions to automatically capture audio and create quizzes/assessments.

Although the present invention has been described using various specific embodiments, it will be obvious for a person skilled in the art to practice the embodiments with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method (100) for intelligent interpretation of information to autonomously design in-class/hybrid/remote assessment comprising the steps of:
   a) receiving an audio interaction of a presenter through an audio input device and uploading a course content into a knowledge database; wherein the presenter flags a significant keyword(s) of the audio interaction while speaking into the audio input device through a plurality of means;
   b) capturing the audio interaction of the presenter by an audio capturing module;
   c) transcribing the audio interaction along with the flagged significant keywords by the presenter into a plurality of text by an audio-text conversion module; wherein the transcribing the audio interaction into the plurality of text by the audio-text conversion module, employs an automatic speech recognition system (ASR); and wherein the ASR is made up of statistical models that reflect the mapping of a continuous phonetic sound sequences to the plurality of text outputs recognized as being human language;
   d) saving the transcribed plurality of text and course content in the knowledge database;
   e) analyzing the transcribed plurality of text comprising the flagged significant keywords by a text analyzation module; and the text analyzation module separates the last phrase or sentence, or piece of information received from the presenter;
   f) generating a question based on the course content presented by the presenter by a question generation module;
   g) reviewing and seeking approval of the presenter for the question generated by the question generation module;
   h) publishing the question to a plurality of participants upon receiving the approval from the presenter; and if the presenter disapproves the question generated, the question generation module generates an another question, and seeks approval of the another question from the presenter and if the presenter approves, publishes the another question to the plurality of participants;
   i) saving the approved published question in the knowledge database;
   j) responding to the published question by the plurality of participants;
   k) generating analytics, auto-checking the responses of the plurality of participants and displaying the analytics to the presenter by a response generation module; and generating an alert for the presenter when the plurality of participants constantly responds incorrectly;
   l) displaying the correct response to the plurality of participants; and
   m) generating and storing detailed classroom analytics in the knowledge database.

2. The method (100) according to claim 1, wherein the audio interaction comprises an audio or a video interaction.

3. The method (100) according to claim 1, wherein the audio input device includes a microphone.

4. The method (100) according to claim 1, wherein the plurality of means comprises a specific key on a keyboard, a clicker device including a mouse or a verbal cue spoken into a microphone; and wherein the plurality of means is used in real-time, when the presenter wants to forcefully publish the question to the plurality of participants based on an important information just communicated.

5. The method (100) according to claim 1, wherein the ASR model comprises a Language Model, a Pronunciation Model, a Lexicon/Dictionary, and an Acoustic Model.

6. The method (100) according to claim 1, wherein the question generated by the question generation module includes an empirical or a theoretical question depending on a subject taught by the presenter; and the empirical question includes a mathematical question, a measured question or a calculated question; and the theoretical questions includes a question containing an important piece of information, and a significant keyword(s).

7. The method (100) according to claim 1, wherein the method for generating the question comprises the steps of:
   a) breaking a statement of the presenter, into sentence structures;
   b) identifying the important piece of information in the sentence structures;
   c) applying English grammar rules and machine learning NLP (Natural Language Processing) models;
   d) selecting a topic matching a subject taught by the presenter; and
   e) creating the question.

8. The method (100) according to claim 7, wherein the applying grammar rules and machine learning NLP models for generating the question comprises the steps of:
   a) finding and marking a verb in a sentence;
   b) checking the type of verb in the sentence; and wherein the type of verb in the sentence, is an action verb, a state of being verb, or a linking verb;
   c) finding a subject and a complement in a sentence; wherein the complement includes finding an object of the action verb and the subject and the complement; and the object of the action verb includes a direct object and the complement includes a predictive nominative and a predictive adjective; and the predictive nominative comprises a renaming of the subject and the predictive adjective comprises describing the renamed subject;
   d) saving the object of the action verb and the subject complement in the knowledge database;
   e) finding the object of the action verb and the subject in the course contents uploaded by the presenter in the knowledge database;
   f) getting a type of sentence; which includes a simple sentence and a complex sentence; and
   g) generating the question using English grammar rules for simple sentences and generating the question using machine learning NLP (Natural Language Processing) models for complex sentences.

9. The method (100) according to claim 1, wherein the type of question generated by the question generation modules includes a multiple-choice question, an information-based question, true/false questions, fill in the blank's questions or short answer questions.

10. The method (100) according to claim 1, wherein the presenter can either choose to time the question, by having limited time for the plurality of participants to respond to the question or the presenter may choose not to time the question.

11. The method (100) according to claim 1, wherein the plurality of participants attending a session include a in-class, hybrid class or remote class; and the plurality of participants attending remotely can respond to the questions by typing, clicking or dictating.

12. The method (100) according to claim 1, wherein an automatic report is generated, saved, and displayed to the presenter following the plurality of participants response, and the automatic report is displayed to the presenter in graphical format based on a percentage of the plurality of participants choosing to submit a certain response during the course of a session; and wherein the presenter has the option to track the effectiveness of the session while conducting the session.

13. The method (100) according to claim 1, wherein the responses of the plurality of participants generated by the response generation module is auto-checked using an external tool, a software or a service.

14. The method (100) according to claim 1, wherein the detailed classroom analytics comprises a detailed report of the questions published, class reports, course content reports and student reports; and the detailed classroom analytics is stored in the knowledge database; and the detailed classroom analytics is populated after an every session and an aggregate is generated, the detailed classroom analytics is available to the presenter as a the session continues to happen.

15. The method (100) according to claim 1, wherein the detailed classroom analytics generated by the response generator module enables the presenter to identify a poor student performance and build future content, and generate classroom performance and attention level reports for each of the plurality of participants; wherein the attention level reports are shared with a parent of the plurality of the participants.

16. A computer implemented system (100) comprising instructions stored on a non-transitory computer readable storage medium and executed on a hardware processor for intelligent interpretation of information to autonomously design in-class/hybrid/remote assessment comprising:
   a) an audio input device configured to receive an audio interaction of a presenter; wherein the audio interaction comprises a keyword(s) is discretionally flagged by a presenter through a plurality of means;
   b) an audio capturing module configured to capture the audio interaction of the presenter;
   c) an audio-text conversion module configured to transcribe the audio interaction and the discretionally flagged significant keywords by the presenter, into a plurality of text; wherein the transcribing the audio interaction into the plurality of text by the audio-text conversion module, employs an automatic speech recognition system (ASR); and wherein the ASR is made up of statistical models that reflect the mapping of a continuous phonetic sound sequences to the plurality of text outputs recognized as being human language;
   d) a knowledge database configured to maintain the transcribed plurality of text and a course content uploaded by the presenter;
   e) a text analyzation module configured to analyze the transcribed plurality of text, and separate a last phrase,—a sentence, or a piece of information of the flagged significant keywords received from the presenter;
   f) a question generation module configured to generate a question based on the course content presented by the presenter; and the question generated is further subjected to a review and an approval from the presenter; and the question approved by the presenter is published by the question generation module to a plurality of participants for responding; and wherein the question generation module is further configured to generate an another question, seek an approval from the presenter and publish the question to the plurality of participants for responding;
   g) a response generation module configured to generate an analytics, and an auto-check of the responses of the plurality of participants and display the analytics to the presenter; and the response generation module is further configured to send an alert to the presenter, if the plurality of participants constantly responds incorrectly; and the response generation module is further configured to display the precise response to the plurality of participants, generate and store detailed classroom analytics in the knowledge database.

17. The system (200) according to claim 16, wherein the audio interaction comprises an audio or a video interaction.

18. The system (200) according to claim 16, wherein the audio input device includes a microphone.

19. The system (200) according to claim 16, wherein the plurality of means comprises a specific key on a keyboard, a clicker device including mouse, or a verbal cue spoken into the microphone; and wherein the plurality of means is used in real-time, when the presenter wants to forcefully publish the question to the plurality of participants based on an important information just communicated.

20. The system (200) according to claim 16, wherein the ASR model comprises a Language Model, a Pronunciation Model a (Lexicon/Dictionary), and an Acoustic Model.

21. The system (200) according to claim 16, wherein the question generated by the question generation module includes empirical or theoretical questions depending on the subject taught by the presenter; and wherein the empirical questions includes mathematical questions or those that can be measured or calculated; and wherein the theoretical questions include those questions that contain an important piece of information, including significant keywords.

22. The system (200) according to claim 16, wherein the type of question generated by the question generation modules includes a multiple-choice question, an information-based question, true/false questions, fill in the blank's questions or short answer questions.

23. The system (200) according to claim 16, wherein the presenter can either choose to time the question, by having limited time for the plurality of participants to respond to the question or the presenter may choose not to time the question.

24. The system (200) according to claim 16, wherein the plurality of participants attending a session comprises various modes including in-class, hybrid or remotely; and wherein the plurality of participants can respond to the questions by typing, clicking or by dictating if attending remotely.

25. The system (200) according to claim 16, wherein the plurality of participants after responding to the question, an automatic report is generated, saved and displayed to the presenter; and the automatic report is displayed to the presenter in graphical format based on a percentage of the plurality of participants choosing to submit a certain response during the course of a session; and wherein the presenter has the option to track the effectiveness of the session while conducting the session.

26. The system (200) according to claim 16, wherein the response generation module configured to auto-check the responses of the plurality of participants is carried out using an external tools, software or service.

27. The system (200) according to claim 16, wherein the response generation module configured to generate a detailed classroom analytics comprising a detailed report of the questions published, a class reports, a course content reports and a student reports; and the detailed classroom analytics is stored in the knowledge database; and the detailed classroom analytics is populated after an every session and an aggregate is generated, the detailed classroom analytics is available to the presenter as session continues.

28. The system (200) according to claim 16, wherein the detailed classroom analytics generated by the response generator module enables the presenter to identify a poor student performance and build a better future content; and the detailed classroom analytics enables the presenter to generate a classroom performance report and an attention level report(s) for each of the plurality of participants; and the attention level reports are shared with a parent(s) of the plurality of the participants.

29. The system (200) according to claim 16, wherein the system further enables the presenter to evaluate his/her own performance by generating an aggregate engagement score of the plurality of participants; and wherein the aggregate engagement score is high for the plurality of participant, when the presenter is doing a good job and if the aggregate engagement score of the plurality of participants is below average, then the presenter is notified about such a lesson delivery.

* * * * *